(12) United States Patent
Nakashima

(10) Patent No.: US 10,295,395 B2
(45) Date of Patent: May 21, 2019

(54) FUEL TANK

(71) Applicant: TOYOTA JIDOSHA KABUSHIKI KAISHA, Toyota-shi, Aichi-ken (JP)

(72) Inventor: Tomoki Nakashima, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/785,912

(22) Filed: Oct. 17, 2017

(65) Prior Publication Data

US 2018/0128668 A1    May 10, 2018

(30) Foreign Application Priority Data

Nov. 4, 2016  (JP) .................................. 2016-216576

(51) Int. Cl.
*G01F 23/60* (2006.01)
*G01F 23/30* (2006.01)
*B60K 15/03* (2006.01)

(52) U.S. Cl.
CPC .............. *G01F 23/60* (2013.01); *G01F 23/30* (2013.01); *G01F 23/603* (2013.01); *B60K 15/03* (2013.01); *B60K 2015/03217* (2013.01)

(58) Field of Classification Search
CPC ........... G01F 21/36; G01F 23/56; G01F 23/60
See application file for complete search history.

(56) References Cited

U.S. PATENT DOCUMENTS 3,678,750 A * 7/1972 DiNoia ................... G01F 23/72
200/84 C

FOREIGN PATENT DOCUMENTS

| DE | 19921541 A1 | 11/2000 |
| DE | 10 2012 009 157 A1 | 11/2013 |
| EP | 0038894 A2 | 11/1981 |
| JP | S56-139623 U | 10/1981 |

\* cited by examiner

*Primary Examiner* — Erika J Villaluna
(74) *Attorney, Agent, or Firm* — Oliff PLC

(57) ABSTRACT

A fuel tank has a tank body, a post, a first resistor, and a second resistor, a floating body, a detecting part, and a guiding part. The tank body stores fuel. The post is formed in a tubular shape, is formed with a flow port, and is joined to the bottom wall and the top wall. The first resistor and the second resistor are provided inside the post and extend in a height direction. The floating body is provided with a conductor, is formed with guided parts, and floats on the fuel inside the post. The detecting part energizes the first resistor, the conductor, and the second resistor to detect the position of the floating body in the height direction. The guiding part is provided on the post to guide the guided parts in the height direction.

7 Claims, 5 Drawing Sheets

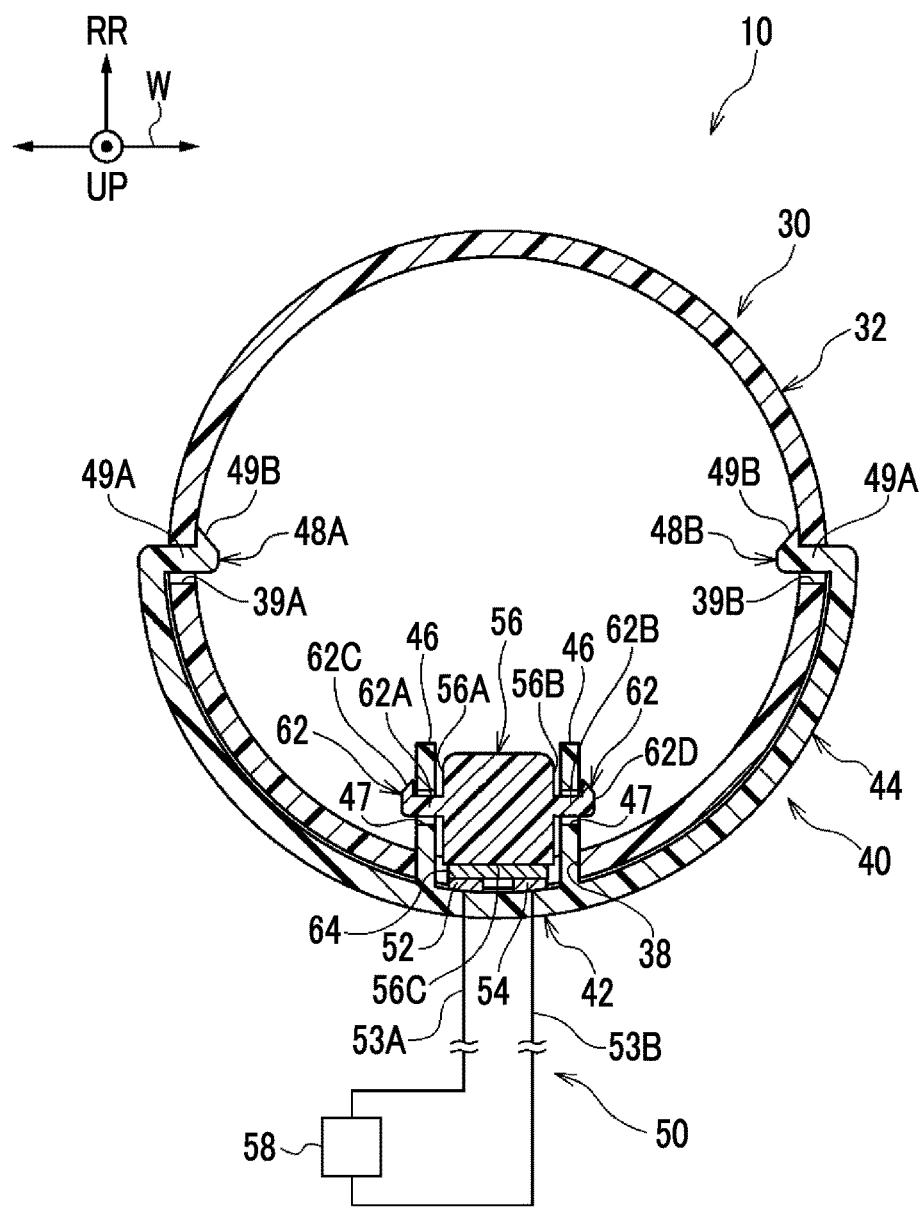

FUEL TANK

INCORPORATION BY REFERENCE

The disclosure of Japanese Patent Application No. 2016-216576 filed on Nov. 4, 2016 including the specification, drawings and abstract is incorporated herein by reference in its entirety.

BACKGROUND

1. Technical Field

The disclosure relates to a fuel tank.

2. Description of Related Art

A fuel tank in which a rod is provided inside the fuel tank and a level sensor that detects the liquid level height of fuel is provided outside the rod is disclosed in German Unexamined Patent Application Publication No. 102012009157.

SUMMARY

In a fuel tank in which a post is provided inside a tank body and the position of a floating body floating on fuel is detected by the detecting part, the floating body is provided at a tip of an arm provided at the post. In the fuel tank, in order to make the floating body movable between an empty position where the fuel inside the tank body is an empty state and a full position where the fuel is full, there is a need to set the length of the arm to be longer. Here, when the length of the arm is set to be longer, there is a possibility that the arm may come into contact with other components, such as a pipe inside the tank body. For this reason, the post is disposed such that the arm does not come into contact with other components. As a result, the degree of freedom of arrangement of the post inside the tank body becomes low. That is, in the fuel tank in which the post is provided inside the tank body and the position of the floating body floating on fuel is detected by the detecting part, there is room for improvements in order to enhance the degree of freedom of arrangement of the post inside the tank body.

The disclosure provides a fuel tank that can enhance the degree of freedom of arrangement of a post inside a tank body, in which the post is provided inside the tank body and the position of a floating body floating on fuel is detected by a detecting part.

A first aspect relates to a fuel tank including a tank body in which fuel is stored, which is defined by a bottom wall, a side wall, and a top wall; a post that is formed in a hollow tubular shape, is provided with a flow port through which the fuel flows, and is joined to the bottom wall and the top wall inside the tank body; a first resistor and a second resistor that are provided inside the post and extends in a height direction of the post; a floating body that is provided with a conductor coming into contact with the first resistor and the second resistor, the floating body being provided with a guided part, and floating on the fuel inside the post; a detecting part that energizes the first resistor, the conductor, and the second resistor to detect a position of the floating body in the height direction of the post; and a guiding part that is provided on the post to guide the guided part in the height direction of the post.

According to the aspect, the height position of the floating body changes in a case where the remaining amount of the fuel inside the tank body has changed in a state the detecting part energizes the first resistor, the conductor, and the second resistor. Since a path length for the energization by the detecting part changes as the height position of the floating body changes, electric resistance changes. Then, as the detecting part detects the change in the electric resistance, the height position of the floating body is detected. In other words, the remaining amount of the fuel inside the tank body is detected.

Here, the floating body is disposed inside the post. For this reason, compared to a configuration in which the guiding part and the floating body are disposed outside the post, any interference between other components and the floating body that are provided inside the tank body is suppressed. Moreover, the guided part of the floating body is guided in the height direction of the post by the guiding part provided inside the post. For this reason, since the floating body moves in the height direction of the post, there is no need to enlarge the post even when the floating body is disposed inside the post. Therefore, according to a configuration in which the post is provided inside the tank body and the position of the floating body floating on the fuel is detected by the detecting part, the degree of freedom of arrangement of the post inside the tank body can be enhanced.

In the fuel tank according to the aspect, the post may be provided with engaged parts and an opening extending in the height direction of the post. The fuel tank may further include a bracket that is provided with engaging parts that are engaged with the engaged parts; and the guiding part disposed inside the post through the opening and the bracket is provided with the first resistor and the second resistor.

According to the aspect, the guiding part is disposed inside the post through the opening by engaging the engaged parts with the engaging parts of the bracket from the outside of the post. Moreover, the first resistor and the second resistor are disposed inside the post. In this way, when the guiding part is disposed inside the post, the guiding part inside the post can be disposed from the outside of the post. Thus, there is no need to split the post in the circumferential direction to dispose the guiding part inside the post. Accordingly, since low yield-strength parts of the post decrease compared to a configuration in which the post is split in the circumferential direction, deformation of the post in a case where an external force has acted on the post can be suppressed.

In the fuel tank according to the aspect, the bracket may include a first vertical wall part and a second vertical wall part. The first vertical wall part extends in the height direction of the post, and is provided with the first resistor and the second resistor. The second vertical wall part overhangs from the first vertical wall part in a circumferential direction of the post and is provided with a plurality of the engaging parts at intervals in the circumferential direction.

According to the aspect, the bracket is formed substantially in a cross shape by the first vertical wall part that extends in the height direction of the post and the second vertical wall part that overhangs from the first vertical wall part in the circumferential direction of the post. Here, the spacing between the engaging parts in the circumferential direction widens compared to a configuration in which there is no second vertical wall part, and the contact area between the side surface of the post and the bracket becomes larger. For this reason, an extending direction of the first vertical wall part of the bracket is prevented from being inclined with respect to the height direction of the post. Accordingly, the inclination of a movement direction of the floating body with respect to the height direction of the post can be suppressed.

In the fuel tank according to the aspect, the guided part of the floating body may include arm parts provided on a pair of side surfaces of the floating body, and claw parts provided on tips of the arm parts. The first vertical wall part may have the guiding part that is plate-shaped and extends radially inward of the first vertical wall part and extends in the height direction of the post along the opening of the post. The guiding part may be provided with a guide hole that extends in the height direction of the first vertical wall part and that is engaged with the guided part. Two guiding parts may be disposed to face each other with a spacing in the circumferential direction of the post, and the floating body may be disposed between the two guiding parts in a state where the arm parts of the floating body are inserted into the guide holes of the guiding parts.

In the fuel tank according to the aspect, the first resistor and the second resistor may be provided between the two guiding parts.

In the fuel tank according to the aspect, the first resistor and the second resistor may be disposed so as to be in contact with an inner peripheral surface of the first vertical wall part. The fuel tank may further include a conductor that is disposed between the first resistor and the second resistor, and the floating body.

In the fuel tank according to the aspect, the bracket may include two guiding parts. The two guiding parts may be plate-shaped members that extend radially inward of the post and extend in the height direction of the post along an opening of the post. Each of the guiding parts may extend in the height direction of the post and the guiding part is provided with the guide hole engaged with the guided part. The two guiding parts may be disposed to face each other with a spacing in the circumferential direction of the post, and the floating body is disposed between the two guiding parts in a state where the guided part of the floating body is engaged with the guide hole of each of the guiding parts.

In the fuel tank according to the aspect, the first resistor and the second resistor may be provided between the two guiding parts.

According to the aspect, in a configuration in which the post is provided inside the tank body and the position of the floating body floating on the fuel is detected by the detecting part, the degree of freedom of arrangement of the post inside the tank body can be enhanced.

According to the aspect, compared to a configuration in which the post is split in the circumferential direction, deformation of the post in a case where an external force has acted on the post can be suppressed.

According to the aspect, compared to a configuration in which there is no second vertical wall part, the inclination of the movement direction of the floating body with respect to the height direction of the post can be suppressed.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a cross-sectional view (a cross-sectional view taken along line of FIG. 1) of the post according to the embodiment;

DETAILED DESCRIPTION OF EMBODIMENTS

Hereinafter, a fuel tank 10 according to the embodiment will be described with reference to FIGS. 1 to 5B. In addition, the fuel tank 10 is mounted on a vehicle that is not illustrated. In the respective drawings, the arrow FR indicates a vehicle front, the arrow RR indicates a vehicle rear, the arrow W indicates a width direction of the vehicle, and the arrow UP indicates a vehicle upside. Hereinafter, in a case where an upward-downward direction is simply described, the upward-downward direction is assumed to indicate up and down in an up-down direction of the vehicle. Additionally, in a case where right and left are simply described, the right and left are assumed to indicate a right side and a left side in the width direction of the vehicle in the state of facing a traveling direction of the vehicle. A front-rear direction of the vehicle, the width direction of the vehicle, and the up-down direction of the vehicle are orthogonal to each other.

Figure 1:
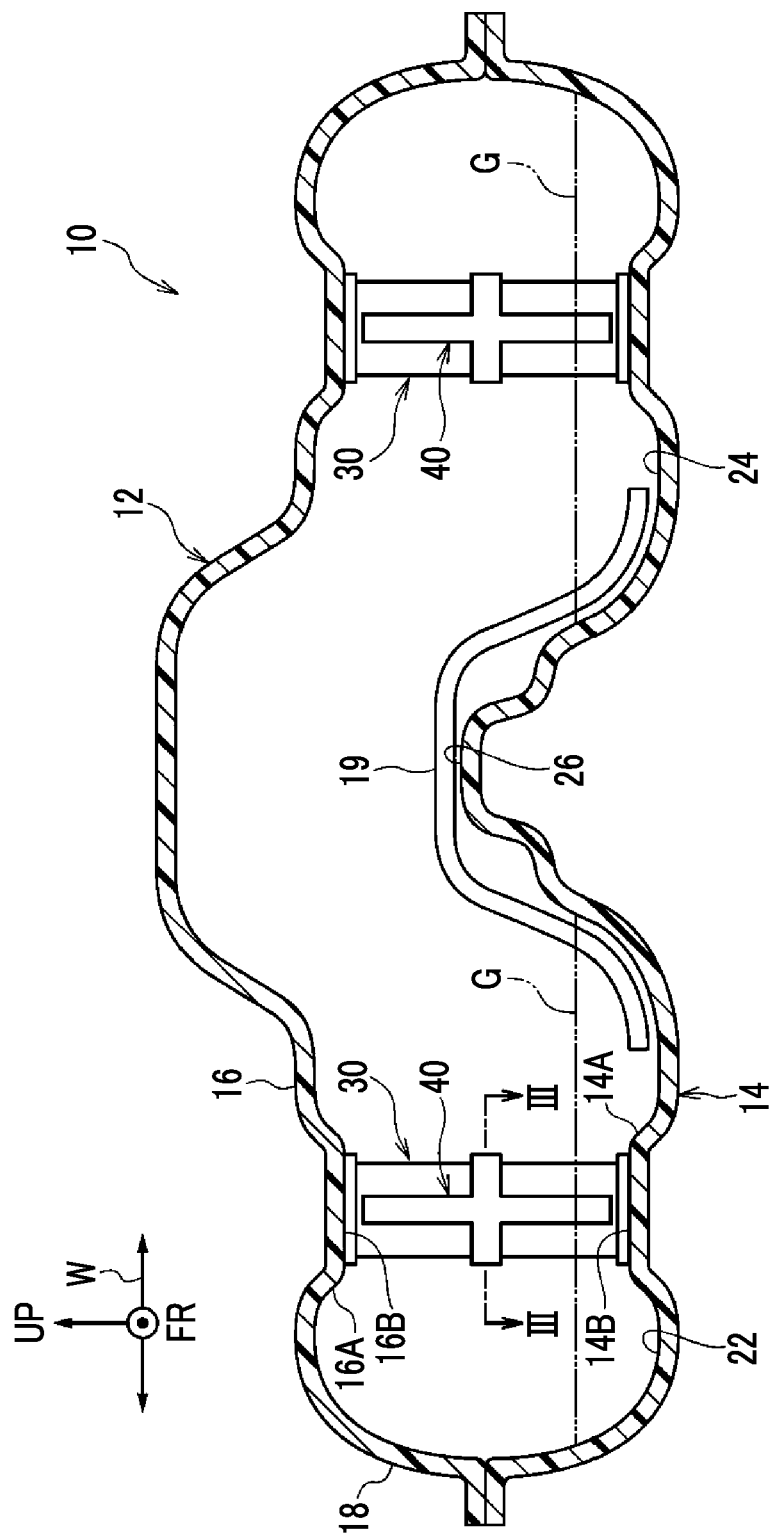
FIG. 1 is a longitudinal sectional view of a fuel tank according to an embodiment.

The fuel tank 10 illustrated in FIG. 1 has, as an example, a tank body 12 in which a liquid fuel G is stored, a post 30 disposed inside the tank body 12, a bracket 40 provided on the post 30, and a detection unit 50 (refer to FIG. 3) that detects the liquid level height of the fuel G. Additionally, the fuel tank 10 is provided with a tube 19, and a pump module (not illustrated) that delivers the fuel G inside the tank body 12 to an engine of the vehicle. In addition, in the present embodiment, the fuel G is composed of gasoline.

Tank Body

The tank body 12 has, as an example, a bottom wall 14 and a top wall 16 that are a pair of wall parts that face each other in the up-down direction of the vehicle, and a side wall 18 that connect an outer peripheral edge of the bottom wall 14 and an outer peripheral edge of the top wall 16 together in the up-down direction of the vehicle, and is formed in a hollow box shape. In the tank body 12, the fuel G is stored inside the tank body surrounded by the bottom wall 14, the side wall 18, and the top wall 16. Additionally, the tank body 12 is, as an example, made of thermoplastic resin. Moreover, the tank body 12 is, as an example, disposed with the width direction of the vehicle as a longitudinal direction and the front-rear direction of the vehicle as a short direction.

The inside of the tank body 12 is partitioned into a first accommodation part 22 and a second accommodation part 24 that are disposed on both sides of a transaxle (not illustrated) in the width direction of the vehicle, and a communication part 26 that is located above the transaxle and connects the first accommodation part 22 and the second accommodation part 24 together. In other words, the fuel tank 10 is formed in a so-called saddle type as seen from the front-rear direction of the vehicle.

The bottom wall 14 extends in the width direction of the vehicle and the front-rear direction of the vehicle. In other words, the bottom wall 14 is disposed in a substantially horizontal direction. The top wall 16 extends in the width direction of the vehicle and the front-rear direction of the vehicle and is disposed in the substantially horizontal direction. Additionally, a pipe (not illustrated) for delivering the fuel G to the engine is attached to the top wall 16. In addition, the tank body 12 is split into two parts, an upper part and a lower part of the side wall 18, and is formed by overlapping and joining the upper part and the lower part together in the up-down direction of the vehicle.

The tube 19 extends from the first accommodation part 22 through the communication part 26 to the second accommodation part 24 inside the tank body 12. Specifically, a first end of the tube 19 is disposed at the bottom within the first accommodation part 22, and a second end thereof is disposed at the bottom within the second accommodation part 24. By filling the tube 19 with the fuel the fuel G is transferred between the first accommodation part 22 and the second accommodation part 24 according to the siphon principle.

Here, the first accommodation part 22 and the second accommodation part 24 are, as an example, symmetrically configured with respect to the center of the communication part 26 in the width direction of the vehicle. For this reason, in the following description, the first accommodation part 22 will be described and the description of the second accommodation part 24 will be omitted.

A lower mounting seat 14A that protrudes in a truncated cone shape upward is formed at the bottom wall 14 of the first accommodation part 22. An upper surface 14B of the lower mounting seat 14A is, as an example, a circular flat surface as seen from the up-down direction of the vehicle. Additionally, an upper mounting seat 16A that protrudes in a truncated cone shape downward is formed on the top wall 16. A lower surface 16B of the upper mounting seat 16A is, as an example, a circular flat surface as seen from the up-down direction of the vehicle. The upper surface 14B and the lower surface 16B face each other in the up-down direction of the vehicle.

Post

Figure 2:
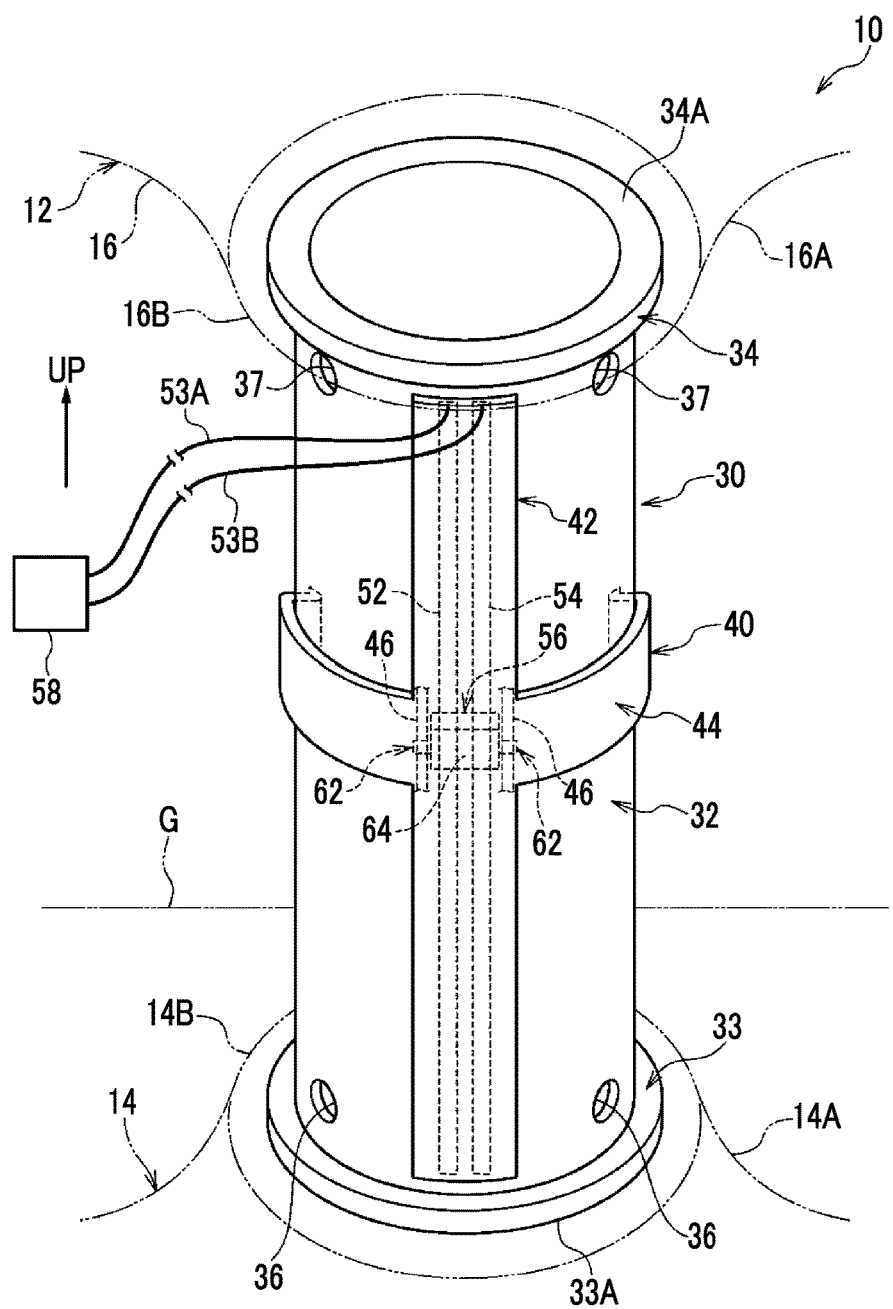
FIG. 2 is an explanatory view of a post according to the embodiment.

The post 30 illustrated in FIG. 2 is made of thermoplastic resin and is formed in a hollow tubular shape. Specifically, the post 30 has a cylindrical part 32 that extends with the up-down direction of the vehicle as an axial direction, a lower flange part 33 that overhangs radially outward of the cylindrical part 32 from a lower end of the cylindrical part 32, and an upper flange part 34 that overhangs radially outward from an upper end of the cylindrical part 32. The length in the up-down direction of the vehicle from a lower surface 33A of the lower flange part 33 to an upper surface 34A of the upper flange part 34 is approximately equal to the spacing in the up-down direction of the vehicle between the upper surface 14B and the lower surface 16B (refer to FIG. 1).

A plurality of flow ports 36 is formed at intervals in a circumferential direction at a lower end of the cylindrical part 32. The flow ports 36 are, as an example, formed in a circular shape. Additionally, the size of the flow ports 36 is a size such that the fuel G (refer to FIG. 1) flows (flows in and flows out) with respect to the inside of the cylindrical part 32. In addition, in a case where a "circumferential direction", the "radial direction", and a "height direction" are described in the following description, the directions respectively mean a "circumferential direction", a "radial direction", and a "height direction" of the post 30.

A plurality of ventilation ports 37 is formed at intervals in the circumferential direction at the upper end of the cylindrical part 32. The ventilation ports 37 are, as an example, formed in a circular shape. Additionally, the size of the ventilation ports 37 is a size such that air and the fuel G (refer to FIG. 1) flow (flow in and flow out) with respect to the inside of the cylindrical part 32.

In a portion, in the circumferential direction, of the cylindrical part 32 illustrated in FIG. 3, as the cylindrical part 32 is seen from the radial direction, a substantially rectangular opening 38 having the up-down direction of the vehicle as a longitudinal direction and the circumferential direction as a short direction is formed from the vicinity of the lower flange part 33 (refer to FIG. 2) to the vicinity of the upper flange part 34 (refer to FIG. 2). In other words, the opening 38 extends in the height direction (the up-down direction of the vehicle). Additionally, the opening 38 passes through the cylindrical part 32 in the radial direction. In addition, the flow ports 36 and the ventilation ports 37 (refer to FIG. 2) as already described are formed at positions shifted in the circumferential direction with respect to the opening 38.

Additionally, two engaged parts 39A, 39B are, as an example, formed at positions shifted from each other by approximately 90 degrees on a first side and a second side in the circumferential direction with respect to the opening 38 substantially at the center of the cylindrical part 32 in the up-down direction of the vehicle. The engaged part 39A and the engaged part 39B are composed of walls of through-holes that pass through the cylindrical part 32 in the radial direction. Additionally, the engaged parts 39A, 39B are disposed to face each other in the radial direction.

The lower flange part 33 and the upper flange part 34 illustrated in FIG. 2 are, as an example, formed in an annular shape as seen from the up-down direction of the vehicle. A space inside the lower flange part 33 and a space inside the upper flange part 34 communicate with a space inside the cylindrical part 32.

Here, in the post 30, the lower surface 33A of the lower flange part 33 is welded to the upper surface 14B of the lower mounting seat 14A, and the upper surface 34A of the upper flange part 34 is welded to the lower surface 16B of the upper mounting seat 16A. In other words, the post 30 is joined to the bottom wall 14 and the top wall 16 inside the tank body 12. The post 30 supports the top wall 16 of the tank body 12.

Bracket

The bracket 40 is made of resin and has a first vertical wall part 42 that extends in the height direction (the up-down direction of the vehicle), and a second vertical wall part 44 that overhangs from the first vertical wall part 42 in the circumferential direction.

First Vertical Wall Part

The first vertical wall part 42 is formed in a substantially rectangular shape having the height direction as a longitudinal direction and having the circumferential direction as a short direction, as seen from the radial direction. As illustrated in FIG. 3, the thickness of the first vertical wall part 42 in the radial direction is, as an example, almost the same thickness as the thickness of the cylindrical part 32 in the radial direction. Additionally, the first vertical wall part 42 is curved in a convex shape radially outward. The curvature of an inner surface of the first vertical wall part 42 in the radial direction is almost the same curvature as the curvature of an outer surface of the cylindrical part 32 in the radial direction.

The width of the first vertical wall part 42 in the circumferential direction is almost the same width as the width of the opening 38 in the circumferential direction. The first vertical wall part 42 covers the opening 38 from a radially outer side in a state where the first vertical wall part is attached to the cylindrical part 32. Two guiding parts 46 that overhang radially inward are respectively formed at both ends of the first vertical wall part 42 in the circumferential direction which are portions of the inner surface of the first vertical wall part 42. In addition, the guiding parts 46 are not limited to being formed on the bracket 40 and may be provided on the bracket 40 separately from the bracket 40. That is, "providing the guiding parts on the bracket" includes not only providing separate guiding parts on the bracket but also forming guiding parts on the bracket to integrate the bracket and the guiding parts.

Two guiding parts 46 are disposed inside the post 30 through the opening 38 by attaching the bracket 40 to the post 30. Specifically, the two guiding parts 46 are formed in a substantially rectangular plate shape having the circumferential direction as a thickness direction as seen from the circumferential direction. Additionally, the two guiding parts 46 have the same shape and the same size and are disposed to face each other with a spacing in the circumferential direction. The spacing has a size such that a floating body 56 to be described below can be accommodated. Moreover, the two guiding parts 46 extend from the vicinity of the lower end of the cylindrical part 32 to the vicinity of the upper end thereof. In addition, guide holes 47 that extend in the height direction substantially at the center in the radial direction are formed in the two guiding parts 46, respectively.

The guide holes 47 pass through the guiding parts 46 in the circumferential direction. The length of the guide holes 47 in the height direction is set according to a range where the liquid level of the fuel G (refer to FIG. 1) is detected (the liquid level height is measured). The two guide holes 47 are disposed to face each other in the circumferential direction. Walls of the two guide holes 47 guide the guided parts 62 of the floating body 56 (to be described below) in the height direction. In addition, insertion holes (not illustrated) that extend in the radial direction are respectively formed at upper ends of the two guiding parts 46. The insertion holes are connected to the guide holes 47 and are used when the floating body 56 is disposed on the guiding parts 46.

A first resistor 52 and a second resistor 54 are provided between the two guiding parts 46 on the inner surface of the first vertical wall part 42. In addition, the first resistor 52 and the second resistor 54 will be described below.

Second Vertical Wall Part

As illustrated in FIG. 2, as an example, the second vertical wall part 44 overhangs from both end surfaces of the first vertical wall part 42 in the circumferential direction to outer sides (the first side and the second side) thereof in the circumferential direction, respectively, at a substantially central part of the first vertical wall part 42 in the height direction. In other words, the bracket 40 is formed substantially in a cross shape as seen from the radial direction.

As illustrated in FIG. 3, the second vertical wall part 44 extends from the first vertical wall part 42 to the engaged parts 39A, 39B along an outer peripheral surface of the cylindrical part 32. The thickness of the second vertical wall part 44 in the radial direction is, as an example, almost the same thickness as the thickness of the cylindrical part 32 in the radial direction. Additionally, the second vertical wall part 44 is curved in a convex shape radially outward. The curvature of an inner surface of the second vertical wall part 44 in the radial direction is almost the same curvature as the curvature of an outer surface of the cylindrical part 32 in the radial direction.

Engaging parts 48A, 48B that protrude radially inward are respectively formed at both ends of the second vertical wall part 44 in the circumferential direction which are portions of the inner surface of the second vertical wall part 44. In other words, the engaging parts 48A, 48B are formed at locations that face the engaged parts 39A, 39B in the second vertical wall part 44 with a spacing in the circumferential direction. Additionally, each of the engaging parts 48A, 48B is composed of a plate-shaped insertion part 49A inserted into a through-hole of each of the engaged parts 39A, 39B, and a claw part 49B protruding in the circumferential direction from a radially inner end of the insertion part 49A. The size of the claw part 49B is a size such that the claw part passes through a through-hole of each of the engaged parts 39A, 39B.

Here, the bracket 40 is attached to the post 30 by engaging the engaging parts 48A, 48B with the engaged parts 39A, 39B in a state where the guiding parts 46 are inserted into the cylindrical part 32 through the opening 38. In addition, the post 30 as a single body, before the post 30 is joined to the tank body 12 (refer to FIG. 1), opens in the height direction. For this reason, the post 30 is joined to the inside of the tank body 12 after the floating body 56 (to be described below) is disposed inside the cylindrical part 32 through the opening.

Detection Unit

The detection unit 50 illustrated in FIG. 3 is configured to include the first resistor 52, the second resistor 54, and the floating body 56, which are provided inside the post 30, and a detecting part 58.

First Resistor

The first resistor 52 is, as an example, composed of a substantially rectangular copper plate. Additionally, the first resistor 52 extends in the height direction between the two guiding parts 46 of the bracket 40 and is fixed to the inner surface of the first vertical wall part 42 on a first side in the circumferential direction. Specifically, the first resistor 52 is disposed with the height direction as a longitudinal direction and the circumferential direction as a short direction. Moreover, the first resistor 52 is exposed toward the inside of the cylindrical part 32. The length of the first resistor 52 in the height direction is slightly shorter than the length of the first vertical wall part 42 in the height direction. One end of a wire 53A is connected to an upper end of the first resistor 52. Most of the wire 53A is disposed outside the post 30.

Second Resistor

The second resistor 54 is, as an example, composed of a substantially rectangular copper plate. Additionally, the second resistor 54 extends in the height direction between the two guiding parts 46 of the bracket 40 and is fixed to the inner surface of the first vertical wall part 42 on a second side in the circumferential direction. Specifically, the second resistor 54 is disposed with the height direction as a longitudinal direction and the circumferential direction as a short direction. Moreover, the second resistor 54 is exposed toward the inside of the cylindrical part 32. The length of the second resistor 54 in the height direction is slightly shorter than the length of the first vertical wall part 42 in the height direction. One end of a wire 53B is connected to an upper end of the second resistor 54. Most of the wire 53B is disposed outside the post 30. Here, the lengths, in the height direction, and the widths, in the circumferential direction, of the first resistor 52 and the second resistor 54 are made almost the same and are disposed with a spacing in the circumferential direction between the two guiding parts 46.

Floating Body

The floating body 56 is, as an example, made of polypropylene of a substantially rectangular parallelepiped shape. For this reason, the floating body 56 floats on the fuel G (refer to FIG. 1) inside the post 30. Additionally, the guided parts 62 are formed at the floating body 56 and are provided with a conductor 64. The size of the floating body 56 is a size such that the floating body fits between the two guiding parts 46. In addition, the material of the floating body 56 may be a material other than the polypropylene as long as the material is a material that floats on the fuel G and has insulation.

The guided parts 62 are, as an example, composed of arm parts 62A, 62B that extend outward from a pair of side surfaces 56A, 56B of the floating body 56, and claw parts 62C, 62D that are formed at ends of the arm parts 62A, 62B opposite to the floating body 56. The arm parts 62A, 62B extend to a first side and a second side in the circumferential direction from the floating body 56. The size of the arm parts 62A, 62B is a size such that the arm parts are inserted through the guide holes 47 so as to be movable in the height direction and extend further to both the outer sides in the circumferential direction than the two guiding parts 46.

The claw parts 62C, 62D extend radially inward from the arm parts 62A, 62B on both the outer sides in the circumferential direction from the two guiding parts 46. As the arm parts 62A, 62B are passed through the insides of the guide holes 47 through the insertion holes (not illustrated) connected to the guide holes 47, the floating body 56 is disposed between the two guiding parts 46. In addition, the size of the floating body 56 in the radial direction is a size such that a gap is formed between an outer surface 56C radially outward of the floating body 56, and the first resistor 52 and the second resistor 54 in a state where the floating body 56 is disposed between the two guiding parts 46.

The conductor 64 is provided on (fixed to) the outer surface 56C of the floating body 56. The conductor 64 is, as an example, composed of a substantially rectangular copper plate having the circumferential direction as a longitudinal direction and having the height direction as a short direction. Additionally, the length of the conductor 64 in the circumferential direction is a length approximately equal to the length from an outer end of the first resistor 52 to an outer end of the second resistor 54. Moreover, the thickness of the conductor 64 is a thickness such that a contact state between the conductor 64, and the first resistor 52 and the second resistor 54 is maintained in a state where the floating body 56 is moved in the height direction or made stationary. That is, a first end of the conductor 64 in the circumferential direction comes into contact with the first resistor 52 in the radial direction, and a second end of the conductor 64 comes into contact with the second resistor 54 in the radial direction.

Here, the movement of the floating body 56 in the radial direction is restricted by the arm parts 62A, 62B and the walls of the two guide holes 47 coming into contact with each other as seen from the height direction. Additionally, the movement of the floating body 56 in the circumferential direction is restricted as one of the claw part 62C and the claw part 62D comes into contact with one of the two guiding parts 46. In other words, the floating body 56 is configured to be guided in the height direction by the guiding parts 46. In addition, the floating body 56 is provided at the guiding parts 46 before the post 30 is joined to the inside of the tank body 12 (refer to FIG. 1).

Detecting Part

The detecting part 58 is electrically connected to the second end side of the wires 53A, 53B. Additionally, the detecting part 58 is configured to include a central processing unit (CPU) and a battery that are not illustrated. The detecting part 58 energizes the first resistor 52, the conductor 64, and the second resistor 54. The detecting part 58 detects the position of the floating body 56 in the height direction based on a change in the combined resistance of the first resistor 52, the conductor 64, and the second resistor 54. A relational expression between the position (liquid level height of the fuel G (refer to FIG. 1)) of the floating body 56 in the height direction and the remaining amount of the fuel G inside the tank body 12 is set in advance at the detecting part 58.

Here, a method for detecting the remaining amount of the fuel G in the detecting part 58 (refer to FIG. 1) will be described with reference to FIGS. 4A and 4B. In addition, in FIGS. 4A and 4B, a connecting position between the wire 53A and the first resistor 52 is represented by Point A, a contact position between the first resistor 52 and the conductor 64 is represented by Point B, a contact position between the conductor 64 and the second resistor 54 is represented by Point C, and a connecting position between the second resistor 54 and the wire 53B is represented by Point D. In addition, since the lengths of the wires 53A, 53B are not changed, the description of the resistance values of the wires 53A, 53B will be omitted. Additionally, the description of changes in the resistance values caused by a temperature change will also be omitted.

Figure 4A:
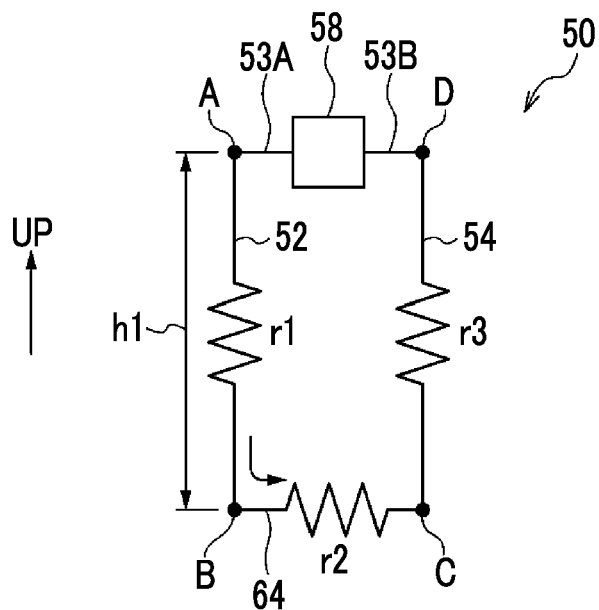
FIG. 4A is an explanatory view illustrating combined resistance in a case where the fuel inside the post according to the embodiment is in an empty state.

A circuit for energization from the detecting part 58 to the first resistor 52, the conductor 64, and the second resistor 54 in a case where the floating body 56 (refer to FIG. 2) is disposed at a position where the inside of the post 30 (refer to FIG. 2) is empty is schematically illustrated in FIG. 4A. In the state where the fuel G is empty, floating body 56 is located at a lowermost part in the height direction, and has a height h1 from Point A to Point B. In addition, the position of the floating body 56 in the height direction in the case where the floating body 56 is located at the lowermost part in the height direction is defined as an origin position. In the above state, the resistance value of the first resistor 52 is defined as r1, the resistance value of the conductor 64 is defined as r2, and the resistance value of the second resistor 54 is defined as r3. The combined resistance (electric resistance) from Point A to Point D is r1+r2+r3. The detecting part 58 performs the energization and detects the combined resistance to detect that the height of the floating body 56 is 0 (the origin position and the empty state where the remaining amount of the fuel G is minimum).

Figure 4B:
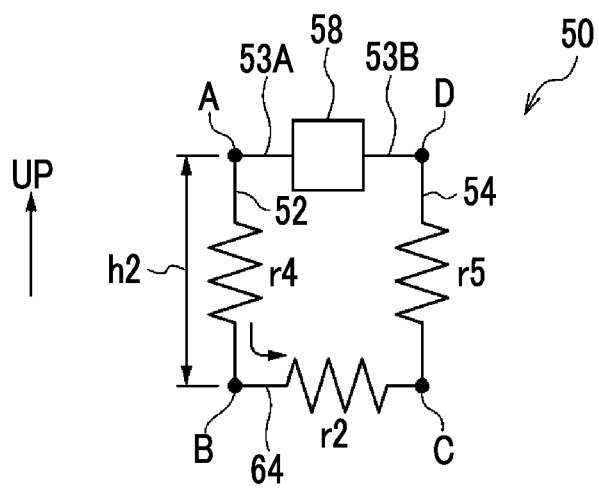
FIG. 4B is an explanatory view illustrating combined resistance in a case where the fuel inside the post according to the embodiment is in a full state.

A circuit for energization from the detecting part 58 to the first resistor 52, the conductor 64, and the second resistor 54 in a case where the floating body 56 (refer to FIG. 2) is disposed at a position where the inside of the post 30 (refer to FIG. 2) is full is schematically illustrated in FIG. 4B. In the state where the fuel G is full, floating body 56 is located at an uppermost part in the height direction and has a height h2 (<h1) from the point A to the point B. In this state, the resistance value of the first resistor 52 is defined as r4 (<r1), the resistance value of the conductor 64 is defined as r2, and the resistance value of the second resistor 54 is defined as r5 (<r3). The combined resistance (electric resistance) from Point A to Point D is r4+r2+r5. The detecting part 58 performs the energization and detects the combined resistance to detect that the position of the floating body 56 in the height direction has increased from the origin position (the full state where the remaining amount of the fuel G is maximum) to a position equivalent to (h1−h2).

In addition, although a description is omitted, the detection of the remaining amount of the fuel G by the detecting part 58 is also performed in a storage state between the empty state and the full state without being limited to two states of the empty state and the full state. Additionally, the insides of the post 30 and the tank body 12 which are illustrated in FIG. 2 communicate with each other via the flow ports 36. For this reason, in the empty state where the inside of the tank body 12 and the outside of the post 30 are empty, the inside of the post 30 is also brought into the empty state. Additionally, in the full state where the inside of the tank body 12 and the outside of the post 30 are filled with the fuel the inside of the post 30 is also filled with the fuel G (refer to FIG. 1).

Working

Next, the working and effects of the fuel tank 10 of the present embodiment will be described.

In the fuel tank 10 illustrated in FIG. 3, the detecting part 58 energizes the first resistor 52, the conductor 64, and the second resistor 54 and detects the remaining amount of the fuel G inside the post 30 (refer to FIG. 1) and the remaining amount of the fuel G inside the tank body 12 (refer to FIG. 1).

Figure 5A:
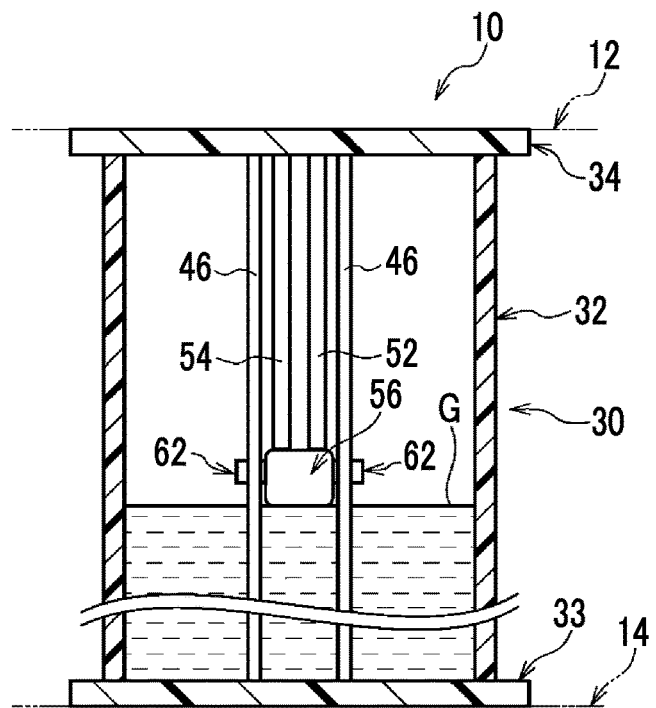
FIG. 5A is an explanatory view illustrating a state of a floating body when the amount of fuel inside the post according to the embodiment is small.
Figure 5B:
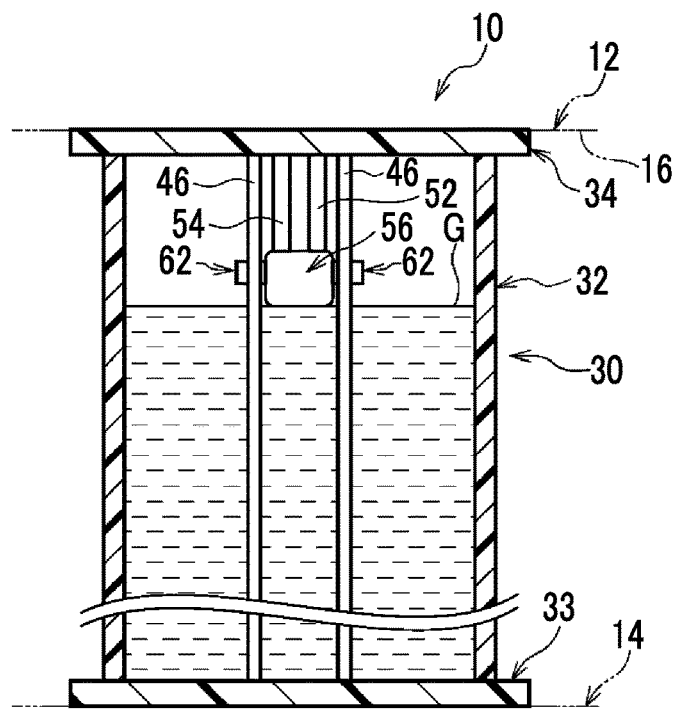
FIG. 5B is an explanatory view illustrating a state of the floating body when the amount of fuel inside the post according to the embodiment is large.

Specifically, as illustrated in FIGS. 5A and 5B, for example, in a case where the remaining amount of the fuel G inside the tank body 12 has increased and the remaining amount of the fuel G inside the post 30 has increased, the height position of the floating body 56 in the height direction rises. On the contrary, in a case where the remaining amount of the fuel G inside the tank body 12 has decreased and the remaining amount of the fuel G inside a post 30 has decreased, the height position of the floating body 56 in the height direction falls. In this way, since a path length for the energization by the detecting part 58 (refer to FIG. 3) changes as the height position of the floating body 56 changes, electric resistance (combined resistance) changes. Then, as the detecting part 58 detects the change in the electric resistance, the height position of the floating body 56 is detected. In other words, the remaining amount of the fuel G inside the tank body 12 is detected.

Here, in the fuel tank 10 illustrated in FIGS. 2 and 3, the floating body 56 is disposed inside the post 30. For this reason, compared to a configuration in which the guiding parts 46 and the floating body 56 are disposed outside the post 30, any interference (contact) between the tube 19 (refer to FIG. 1) or the like and the floating body 56 that are provided inside the tank body 12 is suppressed. Moreover, the guided parts 62 of the floating body 56 are guided in the height direction of the post 30 by the guiding parts 46 provided inside the post 30. That is, the floating body 56 moves (slides) in the height direction of the post 30. For this reason, even when the floating body 56 is disposed inside the post 30, there is no need to enlarge the post 30. By virtue of the above-mentioned working, in a configuration in which the post 30 is provided inside the tank body 12 and the position of the floating body 56 floating on the fuel G is detected by the detecting part 58, the degree of freedom of arrangement of the post 30 inside the tank body 12 can be enhanced.

Additionally, in the fuel tank 10, the guiding parts 46 are disposed inside the post 30 through the opening 38 by engaging the engaged parts 39A, 39B with the engaging parts 48A, 48B of the bracket 40 from the outside of the post 30. Moreover, the first resistor 52 and the second resistor 54 are disposed inside the post 30. In this way, when the guiding parts 46 are disposed inside the post 30, the work can be performed from the outside of the post 30. Thus, there is no need to split the post 30 in the circumferential direction to dispose the guiding parts 46 inside the post 30. Accordingly, since low yield-strength parts of the post 30 decrease compared to a configuration in which the post 30 is split in the circumferential direction, deformation of the post 30 in a case where an external force has acted on the post 30 can be suppressed.

Moreover, in the fuel tank 10, the bracket 40 is formed substantially in a cross shape by the first vertical wall part 42 that extends in the height direction and the second vertical wall part 44 that overhangs from the first vertical wall part 42 in the circumferential direction. Here, compared to a configuration with no second vertical wall part 44, the spacing between the two engaging parts 48A, 48B in the circumferential direction widens, the contact area between the side surface (outer surface) of the post 30 and the bracket 40 becomes larger, and a frictional force between the side surface of the post 30 and the bracket 40 becomes larger. For this reason, an extending direction of the first vertical wall part 42 of the bracket 40 is prevented from being inclined with respect to the height direction of the post 30. Accordingly, the inclination of a movement direction of the floating body 56 with respect to the height direction of the post 30 can be suppressed. Also, a decrease in the detection accuracy of the remaining amount of the fuel G can be suppressed by suppressing the inclination of the movement direction of the floating body 56.

MODIFICATION EXAMPLES

The disclosure is not limited to the above embodiment.

In the fuel tank 10, the guiding parts 46 may be integrally formed inside the cylindrical part 32 without using the bracket 40, the first resistor 52 and the second resistor 54 may be provided, and the floating body 56 may be guided by the guiding parts 46. That is, a configuration may be adopted in which the engaged parts 39A, 39B, the opening 38, the engaging parts 48A, 48B, and the bracket 40 are not used.

The bracket 40 is not limited to a configuration in which the bracket has the first vertical wall part 42 and the second vertical wall part 44. For example, a configuration may be adopted in which the second vertical wall part 44 is not formed, but engaging parts are formed at both ends of the first vertical wall part 42 in the circumferential direction or both ends thereof in the height direction, engaged parts to engage the engaging parts are formed at the cylindrical part 32, and only the first vertical wall part 42 is attached to the post 30. Additionally, a configuration may also be adopted in which the bracket 40 is attached to the inside of the cylindrical part 32 not to the outside thereof.

Moreover, the bracket 40 is not limited to a configuration in which both the first vertical wall part 42 and the second vertical wall part 44 are disposed outside the cylindrical part 32, and a configuration may adopt one of the first vertical wall part 42 and the second vertical wall part 44 may be disposed inside the cylindrical part 32, and the other thereof is disposed outside the cylindrical part 32. Additionally, in the fuel tank 10, an attachment member having the guiding parts 46, the first resistor 52, and the second resistor 54 may be attached to the post 30 by bonding or fastening without using the engaging parts and the engaged parts.

The tank body 12 may be made of metal (for example, iron) without being made of resin as long as a configuration in which an electric current hardly flows from the post 30 to the tank body 12 is adopted. Additionally, the tank body 12 is not limited to a configuration in which the first accommodation part 22 and the second accommodation part 24 are made to communicate with each other in the communication part 26. A configuration may be adopted in which one accommodation part that accommodates the fuel G is formed or three or more accommodation parts are formed.

The number of posts 30 inside the tank body 12 may be one or three or more without being limited to two. Additionally, an outer shape of the post 30 as seen from the height direction may be an elliptical shape or a polygonal shape without being limited to a circular shape. Moreover, the post 30 may be a post in which one of the lower end and the upper end may open and the other thereof may be blocked, without being limited to the post in which the lower end and the upper end in the height direction open.

The engaging parts 48A, 48B may be engaged from the inside of the post 30 toward the outside thereof. Additionally, the engaging parts 48A, 48B may have a configuration in which the claw part 49B is not provided by using the insertion part 49A as a press-fitting part, without being limited to a configuration in which the engaging parts are composed of the insertion part 49A and the claw part 49B.

The first resistor 52, the second resistor 54, and the conductor 64 are not limited to a shape (rectangular shape) in which the width in a direction orthogonal to an energization direction is almost the same width in the energization direction. For example, the sensitivity of detection of the electric resistance (combined resistance) in the detecting part 58 may be increased by changing the width in the direction orthogonal to the energization direction as in a trapezoidal shape or a drum shape.

The floating body 56 may have a spherical shape, an ellipsoidal body shape, or a polygonal body shape without being limited to the rectangular parallelepiped-like floating body. In addition, in the case of the spherical shape or the ellipsoidal body shape, the conductor 64 may be attached after a portion of the spherical shape or the ellipsoidal body shape is cut in a planar shape.

Although the fuel tanks related to the embodiment and the respective modification examples have been described above, the embodiment and the respective modification examples may be appropriately used in combination, and the embodiments can be naturally carried out in various forms without departing from the scope of the disclosure.

What is claimed is:

1. A fuel tank comprising:
    a tank body in which fuel is stored, the tank body being defined by a bottom wall, a side wall, and a top wall;
    a post that is formed in a hollow tubular shape, is provided with a flow port through which the fuel flows, and is joined to the bottom wall and the top wall inside the tank body;
    a first resistor and a second resistor that are provided inside the post and extend in a height direction of the post;
    a floating body that is provided with a conductor coming into contact with the first resistor and the second resistor, the floating body being provided with a guided part, and floats on the fuel inside the post;
    a detecting part that energizes the first resistor, the conductor, and the second resistor to detect a position of the floating body in the height direction of the post; and
    a guiding part that is provided on the post to guide the guided part in the height direction of the post; wherein:
    the post is provided with engaged parts and an opening extending in the height direction of the post; and
    the fuel tank further comprises a bracket that is provided with engaging parts that are engaged with the engaged parts, and the guiding part disposed inside the post through the opening, and the bracket is provided with the first resistor and the second resistor.

2. The fuel tank according to claim 1, wherein the bracket includes
    a first vertical wall part that extends in the height direction of the post, the first vertical wall part being provided with the first resistor and the second resistor, and
    a second vertical wall part that overhangs from the first vertical wall part in a circumferential direction of the post, the second vertical wall being provided with a plurality of the engaging parts at intervals in the circumferential direction.

3. The fuel tank according to claim 2, wherein:
    the guided part of the floating body includes arm parts provided on a pair of side surfaces of the floating body, and claw parts provided on tips of the arm parts;
    the first vertical wall part has the guiding part that is plate-shaped and extends radially inward of the first vertical wall part and extends in the height direction of the post along the opening of the post;
    the guiding part is provided with a guide hole that extends in the height direction of the first vertical wall part and that is engaged with the guided part; and
    two of the guiding parts are disposed to face each other with a spacing in the circumferential direction of the post, and the floating body is disposed between the two guiding parts in a state where the arm parts of the floating body are inserted into the guide holes of the guiding parts.

4. The fuel tank according to claim 3, wherein the first resistor and the second resistor are provided between the two guiding parts.

5. The fuel tank according to claim 4, wherein:
    the first resistor and the second resistor are disposed so as to be in contact with an inner peripheral surface of the first vertical wall part; and
    the fuel tank comprises the conductor, the conductor being disposed between the first and second resistors, and the floating body.

6. The fuel tank according to claim 1, wherein:
    the bracket includes two of guiding parts;
    the two of the guiding parts are plate-shaped members that extend radially inward of the post and extend in the height direction of the post along the opening of the post;
    each of the guiding parts extends in the height direction of the post, and the guiding part is provided with a guide hole engaged with the guided part; and
    the two of the guiding parts are disposed to face each other with a spacing in a circumferential direction of the post, and the floating body is disposed between the two guiding parts in a state where the guided part of the floating body is engaged with the guide hole of each of the guiding parts.

7. The fuel tank according to claim 6, wherein the first resistor and the second resistor are provided between the two of the guiding parts.

* * * * *